US006844051B1

(12) United States Patent
George et al.

(10) Patent No.: US 6,844,051 B1
(45) Date of Patent: Jan. 18, 2005

(54) SEPARATION FINGERS FOR ELECTRO PHOTOGRAPHIC DEVICES

(75) Inventors: Daniel Eugene George, Chadds Ford, PA (US); Shinichi Nakagawa, Utsunomiya (JP); Akira Yokoyama, Utsunomiya (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/743,330

(22) PCT Filed: Jul. 29, 1999

(86) PCT No.: PCT/US99/17333

§ 371 (c)(1),
(2), (4) Date: Jan. 5, 2001

(87) PCT Pub. No.: WO00/07074

PCT Pub. Date: Feb. 10, 2000

(30) Foreign Application Priority Data

Jul. 30, 1998 (JP) .......................................... 10/216000

(51) Int. Cl.[7] ........................ B65H 29/54; G03G 15/20; G03G 15/14; B32B 23/02

(52) U.S. Cl. ....................... 428/192; 399/323; 399/398; 271/307; 271/311

(58) Field of Search ................................ 428/192, 336; 271/307, 311; 399/398, 323

(56) References Cited

U.S. PATENT DOCUMENTS 4,687,696 A * 8/1987 Satoji .......................... 428/92
5,160,130 A * 11/1992 Fromm et al. .............. 271/307
5,997,965 A * 12/1999 Shimazu et al. ........... 128/1.32

FOREIGN PATENT DOCUMENTS

JP 04102883 * 3/1992 .......... G03G/15/20

* cited by examiner

*Primary Examiner*—Rena Dye
*Assistant Examiner*—Lawrence Ferguson

(57) ABSTRACT

This invention relates to a separation finger used in an Electro photographic device such as photocopying devices and laser-beam printers. More specifically, it relates to a separation finger with remarkably improved durability which has a sharp tips and is capable of preventing paper jams, caused by, for example, adhesion of the toner, over extended periods of time.

3 Claims, No Drawings

SEPARATION FINGERS FOR ELECTRO PHOTOGRAPHIC DEVICES

BACKGROUND OF THE INVENTION

Development has been done previously to realize a separation finger that will prevent the occurrence of paper jams caused by, for example, the adhesion of the toner.

There are separation fingers molded from a polyimide resin which has a coating of a tetrafluoroethylene-perfluoroalkylvinyl ether copolymer at least for the tip portion which the copying paper touches (Published Unexamined Application No.: Hei 1-72182), and a separation finger molded of a polyamideimide resin or polyphenylene sulfide resin that have a coat of a multilayer structure consisting of a primer layer and top layer of a fluororesin.

In addition to the technology to coat a fluororesin on the surfaces of separation fingers, separation fingers for Electro graphic devices made by compression-molding and sintering blends consisting of 40 to 90 wt % polyimide resin and 60 to 10 wt % fluororesin such as polytetrafluoroethylene resin (PTFE) (Published Unexamined Application No. Hei 4-102883), and separation fingers made by compression-molding blends of 30 to 90 wt % polyimide resin and 70 to 10 wt % tetrafluoroethylene-perfluoroalkyl-vinyl ether copolymer to obtain a compressed powder product for Separation fingers having configurations of 70 μm or less in finger tips' inscribed circle diameter, and then sintering the powder product (Published Unexamined Application No. Hei 6-19360), have also been developed.

However, the improvement of the quality and life of copying equipment and other electro photographic devices, as well as the recent trend toward wider use of recycled paper, have made it necessary to improve separation fingers in non-adhesion to toner and wear resistance under the conditions of friction caused by toner and paper dust, and also to minimize the diameters of the tips of separation fingers. Thus, the object of this invention is to solve such problems and offer separation fingers for Electro photographic devices that have sharper tips and better wear resistance, non-adhesion of toner, and durability, without requiring fluororesin coating. Moreover, the separation fingers of this invention have outstanding durability, capable of retaining non-adhesion of toner even when their surfaces have worn.

SUMMARY OF THE INVENTION

After working actively on research to solve the above-mentioned problems, these inventors found that it was possible to provide separation fingers having improved wear resistance and non-adhesion of toner by using polytetrafluoroethylene resin (PTFE) powder falling into certain ranges of weight-average molecular weight and average particle size, polyimide resin powder.

The separation fingers for electrophotographic devices of this invention developed to solve the above problems were characteristically obtained by compression-molding, and then sintering, blends obtained by blending polyimide resin powder and polytetrafluoroethylene resin (PTFE) powder which is 500,000 to 1,000,000 in weight-average molecular weight and 5 to 20 μm in average particle size, at weight-based ratios of 70:30 to 95:5.

Other separation fingers of this invention are the above mentioned separation fingers that are characterized by their tips being 50 μm or less in diameter.

Still other separation fingers of this invention are either of the above types that are characterized by the water-repelling angles of the separating finger surfaces being 100° C. or more and such surface water-repelling angles being at least 90° C. even when the surfaces of the separation fingers have worn to 50 μm.

DETAILED DESCRIPTION OF THE INVENTION

The polyimide resin powder used in this invention is a condensation polymer, copolymer, etc, of one or more acids selected from a group consisting of pyromellitic dianhydride, 3,3',4,4'-biphenyltetra-carboxylic dianhydride, and 3,3',4,4'-benzophenonetetra-carboxylic dianhydride, and one or more diamines selected from a group consisting of 4,4'-diaminodiphenyl ether, 1,3-phenylene-diamine, and 1,4-phenylene diamine. A condensation which is a copolymer of 3,3',4,4'-biphenyltetracarboxylic dianhydride and 1,3'-phenylenediamine and 1,4'-phenylenediamine, is preferable because its thermal distortion temperature is quite high, at 340° C., and its strength and elongation are well balanced. A condensation polyimide of 4,4'-diaminodiphenyl ether and pyromellitic dianhydride is especially preferable.

The polytetrafluoroethylene resin (PTFE) powder used in this invention is 500,000 to 1,000,000 in weight-average molecular weight and 5–20 μm in average particle size. Polytetrafluoroethylene resin (PTFE) can easily withstand the sintering temperature of any of the above polyimide resin powders because it has a high melting point; whereas, other known fluororesins decompose when the polyimide resin powder is sintered.

The weight-average molecular weight of the polytetrafluoroethylene resin (PTFE) powder is preferably 600,000 to 800,000, and more preferably 600,000 to 700,000. Its average particle size is preferably 5 to 15 μm, and more preferably 7 to 12 μm. If its weight-average molecular weight is less than 500,000, the powder thermally decomposes at the sintering temperature of the polyimide resin, and the separation finger's performance becomes uneven. On the other hand, if the weight-average molecular weight is greater than 1,000,000, PTFE with high molecular weight melts at 327° C. and sintering temperature of the polyimide in the range of 380 to 500° C., the melt viscosity is very high and the melt flow is very low, and its spread over the separation finger's surface becomes insufficient. Also, an average particle size either smaller than 5 μm or larger than 20 μm would result in poor dispersion and thence inability to obtain a having a good surface.

The blending ratio of the polyimide resin powder and polytetrafluoroethylene resin powder is 70:30 to 95:5 based on weight. It is preferably 80:20 to 90:10, and more preferably 85:15. If the polytetrafluoroethylene resin powder is blended at a ratio of less than 5, the powder's non-adhesion of toner would be insufficient, and if it is blended at a ratio of greater than 30, the tip strength of the separation finger would be reduced excessively.

In this invention, graphite can be blended, along with the polytetrafluoroethylene resin powder, into the polyimide resin powder to the extent that it will not affect the separation finger's performance capability. The separation finger of this invention is obtained by blending polyimide resin powder and polytetrafluoroethylene resin powder, 500,000 to 1,000,000 in weight-average molecular weight and 5 to 20 μm in average particle size, at a weight-based ratio of 70:30 to 95:5, and then sintering the compound. The polyimide resin and polytetrafluoroethylene resin (PTFE) powders are dry-blended. The blending must be accomplished under a set of conditions that will not cause excessive working of the polyimide resin powder. The compression-molding is normally done at a compression surface pressure of at least 40,000 psi, and the sintering is normally done at a temperature of 380 to 500° C. for four hours or longer to achieve complete conversion to polyimide. It is preferable to wash and barrel-grind (tumble) the material with an abrasive media after sintering so that the separation fingers have a smoother surface.

The tip diameter of the separation finger of this invention is preferably not greater than 50 μm, and more preferably not greater than 30 μm. When a fluororesin is coated over a separation finger made of a polyimide resin, it is extremely difficult to obtain a less-than-50 μm tip diameter; whereas, in this invention, it is easier to ensure the precision of the molded article because no coating is applied.

In this invention, the water-repelling angle of the separation finger surface was used as an indicator of the non-adhesion of toner to the finger surface. Water-repelling angle was measured by dropping approx. 0.4 μl of distilled water on to the surface of the separation finger using a hypodermic needle and then measuring the contact angle using an image processing type contact angle meter (Model CA-X 150, made by Kyowa later Science Co., Ltd.).

The water-repelling angle of the surface of a separation finger obtained by compression-molding and sintering a blend obtained by blending polyimide resin powder and polytetrafluoroethylene resin powder, 500,000 to 1,000,000 in weight-average molecular weight and 5 to 20 μm in average particle size, at a weight-based ratio of 70:30 to 95:5 is at least 100 degree, and the separation finger's surface retains a water-repelling angle of at last 90 degrees even when it has worn to 50 μm. When a fluororesin is coated over a separation finger, the coat thickness is 30 to 50 μm. By contrast, in the case of the separation fingers of this invention, the finger surface not only has non-adhesion of toner without requiring coating, but also retain non-adhesion of toner even when the surface layer has worn, and thus is more durable than a coated separating finger.

This invention is further explained below by citing examples of use; however, the applicability of this invention is not limited to these examples of use.

EXAMPLES 1–2 AND COMPARATIVE EXAMPLES 1–4

Polyimide resin powder (Vespel(registered trademark) Si'-1, made by DuPont), which is a condensation polymer of 4, 4'-diaminodiphenyl ether and pyromellitic anhydride, and polytetrafluoroethylene resin powder having the weight-average molecular weight and average particle sizes shown in Table-1 were dry-blended at a weight-based ratio of 90:10, filled into a mold for separation fingers compressed at pressures of 40,000 psi or higher, and sintered at 380 to 500° C. temperature for four hours or longer. The material was washed and barrel-grind(tumble with an abrasive media) after sintering to make separation finger approx. 30 μm in tip diameter. A separation finger was made under the same manufacturing conditions but using the same polyimide resin powder alone as a control.

The surfaces of the separation fingers obtained were visually observed. The results are shown in Table-1.

TABLE 1

| | PTFE Wt-average Molecular wt. | PTFE Ave. particle Size (μm) | Visually observed finger surface conations |
|---|---|---|---|
| Example 1 | 600,000–700,000 | 7–12 | A |
| Example 2 | 1,000,000 | 20 | B |
| Comparative Example 1 | 80,000–90,000 | 2.5–4.5 | C |
| Comparative Example 2 | 400,000–500,000 | 8–15 | C |
| Comparative Example 3 | 110,000 | 4–12 | C |
| Comparative Example 4 | 150,000–200,000 | 8–15 | C |

EXAMPLE 4

A: Virtually equal to Control I in surface smoothness.

B: Has some surface defects (swelling, void, etc.) compared with Control 1.

C: Has serious defects compared with Control 1.

When Examples 1 and 2 are compared with Comparative Example 1, it is found that no separation finger having a smooth surface is not obtainable if the weight-average molecular weight and average particle size of the polytetrafluoroethylene powder deviate from the ranges of this invention.

Also, when Examples 1 and 2 are compared with Comparative Examples 2 to 4, it is found that a separation finger having a smooth surface is not obtainable if the weight-average molecular weight of the polytetrafluoroethylene powder deviates from the range of this invention, even when the powder's average particle size is within the range of this invention, because of poor dispersion of the polytetrafluoroethylene resin powder.

EXAMPLES 3–6

Polyimide resin powder (Vespel (registered trademark) SP-1, made by DuPont), which is a condensation polymer of 4,4' aminodiphenyl ether and pyromellitic dianhydride, and polytetrafluoroethylene resin powder having a weight-average molecular weight of 600,000 to 700,000 and average particle size of 7 to 12 μm were dry-blended at the weight-based ratios shown in Table-2, filled into a mold for separation fingers, compressed at pressures of 40,000 psi or higher, and sintered at a temperature of 380 to 500° C. for four hours or longer. The material was washed and tumbled with an abrasive media (barrel-grind) after sintering to make separation fingers approx. 30 μm in tip diameter. The tip strength of the separation fingers so obtained and that of the separation finger of Control-I were measured. Specifically, the tip strength of the separation fingers was obtained by fixing the separation finger on the base of a compression tester so that its paper-running surface would be perpendicular to the base, applying a load on the finger tip from the vertical direction, and measuring the load when the tip broke. The test results are shown in Table-2.

TABLE 2

| | PI:PTFE | Tip strength at normal temp. (kgf) | Tip strength at 200° C. ambient temp. (kgf) |
|---|---|---|---|
| Example 3 | 70:30 | 0.5 (−74%) | 0.4 (−69%) |
| Example 4 | 80:20 | 0.8 (−58%) | 0.6 (−54%) |
| Example 5 | 85:15 | 1.1 (−42%) | 0.9 (−31%) |

TABLE 2-continued

| | PI:PTFE | Tip strength at normal temp. (kgf) | Tip strength at 200° C. ambient temp. (kgf) |
|---|---|---|---|
| Example 6 | 95:5 | 1.2 (−37%) | 1.0 (−23%) |
| Control 1 | 100:0 | 1.9 | 1.3 |

The numbers in ( ) represent the drops in tip strength in the various examples of use compared with the tip strength of Control 1.

When Examples 3 to 6 are compared with Control 1, it is found that the tip strength drops more when more polytetrafluoroethylene resin powder is blended, when tested either at normal temperature or at elevated temperature.

EXAMPLE 7 AND COMPARATIVE EXAMPLES 5–6

Polyimiide resin powder (Vespel® SP-1, made by DuPont), which is a condensation polymer of 4,4'-diaminodiphenyl ether and pyromellitic dianhydride, and polytetrafluoroethylene resin powder having a weight-average molecular weight of 600,000 to 700,000 and average particle size of 7 to 12 μm were dry-blended at a ratio of 85:15, filled into a mold for separation fingers, compressed at pressure of 40,000 psi or higher, and sintered at 380° C. to 500° C. temperature for four hours or longer. The material was washed and barrel-ground (tumbled with an abrasive media) after sintering to make separation fingers approx. 30 μm in tip diameter. This was measured by dropping approx. 0.4 μl of distilled water on to the surface of the separating finger so obtained, using a hypodermic needle, and then measuring the contact angle using an image-processing type contact angle meter (Model CA-X 150, made by Kyowa Interface Science Co., Ltd.). Further, after the surface was ground to 50 μm, using 1,000 mesh water-resistant abrasive paper, the angle of contact with water was measured in a similar manner to obtain the water-repelling angle.

Also, polyimide resin powder (Vespel®SP-1, made by DuPont), which is a condensation polymer of 4,4'-diaminodiphenyl ether and pyromellitic dianhydride, was filled into a mold for separation fingers compressed at compression surface pressures of 40,000 psi or higher, and sintered at 380° C. to 500° C. temperature for four hours or longer. The material was washed and barrel-ground (tumbled with an abrasive media) after sintering. The water-repelling angle of the paper scrapper was similarly measured to obtain Comparative Example 5.

A coating layer—consisting of a primer layer 10 μm in average coat thickness and a top layer 20 μm in average coat thickness—was formed by applying and drying a primer of a tetrafluoroethylene/perfluoroalkylvinyl ether copolymer over the surface of a separation finger made in a similar manner as Comparative Example 5, and further spray-coating, and then sintering, a top coat of dispersed (average particle size:0.2 to 0.4 μm) tetrafluoroethylene/perfluoroalkylvinyl ether copolymer over it. The product was used as Comparative Example 6.

The water-repelling angle of the separation finger surface so obtained was similarly measured. Then, as with Example 7, the water-repelling angle of the surface was measured after grinding it to 50 μm using 1,000-mesh water resistant abrasive paper. The water-repelling angle test was run three time for each to obtain the average value. The results are shown in Table-3.

TABLE 3

| | Water-repelling angle (contact angle of water) (deg.) | Water-repelling angle of surface after 50 μm grinding (deg.) |
|---|---|---|
| Example 7 | 107.4 | 100.9 |
| Comparative Example 5 | 81.7 | — |
| Comparative Example 6 | 107.3 | 74.7 |

When Example 7 and Comparative Example 5 are compared, it is found that the blending of polytetrafluoroethylene resin powder results in higher water repellency of the surface of the separation finger. This is believed to indicate improved non-adhesion of toner.

When Example 7 and Comparative Example 6 are compared, it is found that the surface of the separation finger of this invention has equal non-adhesion of toner as when a fluororesin is coated. It is also found that the separation finger of this invention retains outstanding non-adhesion of toner even when its surface is ground to 50 μm, but that a separation finger coated with a fluororesin loses its non-adhesion because the maximum possible coat thickness of such a finger is approximately 50 μm

EXAMPLE 8

A paper running test was conducted by installing the separation finger of Example 1 on a commercially available medium-speed photocopying device and running size A-4 copying paper at a rate of 30 sheets/min. No troubles such as toner adhesion or tip wear occurred with the finger even when 100,000 sheets had been run, nor did the tip cause any scratches on the fixed roll which it touches directly.

What is claimed is:

1. A separation finger for Electro photographic devices, being formed by compression-molding a blend of polyimide resin powder and polytetrafluoroethylene resin powder into the separation finger, followed by sintering the separation finger having its tip diameters being not greater than 30 μm, wherein the blend comprises a weight-based blending ratio of said polyimide resin powders and polytetrafluoroethylene resin powders being 70:30 to 95:5 and said polytetrafluoroethylene resin powder being 500,000 to 1,000,000 in weight-average molecular weight and 5 to 20 micro in average particle size and wherein said separation finger having no fluororesin coating.

2. The separation finger of claim 1 having a surface wherein the water-repelling angles of the surface of the separation finger are at least 100 degrees.

3. The separation finger of claim 2, wherein said surface when worn to 50 μm retains the water-repelling angles of at least 90 degrees.

* * * * *